(12) United States Patent
Van Doorn (10) Patent No.: US 10,638,781 B2
(45) Date of Patent: May 5, 2020

(54) METHOD FOR THE PREPARATION OF INSTANT STIR-FRIED POTATO STRINGS

(71) Applicant: HZPC HOLLAND B.V., XG Joure (NL)

(72) Inventor: Johannes Elisabert Van Doorn, Grootebroek (NL)

(73) Assignee: HZPC HOLLAND B.V., Joure (NL)

( * ) Notice: Subject to any disclaimer, the term of this patent is extended or adjusted under 35 U.S.C. 154(b) by 0 days.

(21) Appl. No.: 15/111,898

(22) PCT Filed: Jan. 15, 2015

(86) PCT No.: PCT/NL2015/050023
§ 371 (c)(1),
(2) Date: Jul. 15, 2016

(87) PCT Pub. No.: WO2015/108417
PCT Pub. Date: Jul. 23, 2015

(65) Prior Publication Data
US 2016/0331008 A1  Nov. 17, 2016

(30) Foreign Application Priority Data

Jan. 17, 2014 (NL) ...................... 2012106

(51) Int. Cl.
*A23L 19/12* (2016.01)
*A23L 19/18* (2016.01)

(52) U.S. Cl.
CPC .............. *A23L 19/14* (2016.08); *A23L 19/18* (2016.08); *A23V 2002/00* (2013.01)

(58) Field of Classification Search
CPC .......... A23L 19/14; A23L 19/18; A23L 18/14; A23L 19/15; A23L 19/19; A23L 19/12
See application file for complete search history.

(56) References Cited

U.S. PATENT DOCUMENTS 2,426,398 A * 8/1947 Lathrop ................. A01D 33/08
                                                         209/173
3,355,299 A   11/1967 McLaughlin et al.
5,095,794 A * 3/1992 Mendenhall ......... B26D 1/0006
                                                          83/402

(Continued)

FOREIGN PATENT DOCUMENTS

CN           101744039           6/2010

OTHER PUBLICATIONS

"Balagan Recipes: Steven's meanderings in a world of food." Feb. 21, 2009. <balaganrecipes.info/potato-varieties/>. Accessed May 10, 2018. (Year: 2009).*

(Continued)

*Primary Examiner* — Ericson M Lachica
(74) *Attorney, Agent, or Firm* — Browdy and Neimak, PLLC

(57) ABSTRACT

Described is a method for the preparation of instant stir-fried potato strings having a refrigerated shelf life before stir-frying, comprising the steps of providing potatoes, cutting the potatoes in strings having a cross-sectional area of 25 mm² or less, heating the potato strings, blast chilling the heated potato strings and packaging and storing the potato strings at a refrigerated temperature, the method being free of contacting the potato strings with oil.

18 Claims, 7 Drawing Sheets

A

B

C

D

(56) References Cited

U.S. PATENT DOCUMENTS

| | | | | | |
|---|---|---|---|---|---|
| 5,393,544 | A | * | 2/1995 | Hannah | A23L 19/18 426/250 |
| 5,789,012 | A | * | 8/1998 | Slimak | A21D 13/04 426/629 |
| 6,514,554 | B1 | * | 2/2003 | Minelli | A23L 19/18 426/438 |
| 6,890,580 | B1 | * | 5/2005 | Villagran | A23B 7/02 426/473 |
| 2002/0127315 | A1 | * | 9/2002 | Doan | A23B 7/0053 426/399 |
| 2005/0266144 | A1 | * | 12/2005 | Hamann | A23P 20/12 426/637 |
| 2007/0020377 | A1 | * | 1/2007 | Thomas | A23B 7/04 426/637 |
| 2009/0214737 | A1 | * | 8/2009 | Kelly | A47J 31/405 426/516 |

OTHER PUBLICATIONS

"Tesco offers red, heart-shaped potatoes (Franceline) for Valentine's Day." Feb. 8, 2009. <https://www.potatopro.com/news/2009/tesco-offers-red-heart-shaped-potatoes-franceline-valentines-day>. Accessed May 11, 2018. (Year: 2009).*

"Potatoes: Factors affecting dry matter." Aug. 2010. <http://agriculture.vic.gov.au/agriculture/vegetables/vegetables-a-z/potatoes/potatoes-factors-affecting-dry-matter/>. Accessed Nov. 16, 2018. (Year: 2010).*

International Search Report, International Application No. PCT/NL2015/050023, dated Mar. 17, 2015, 3 pages.

Potatoes: Measurement of specific gravity, downloaded from http://agriculture.vic.gov.au/agriculture/horticulture/vegetables/vegetable-a-z/potatoes/potatoes-measurement-of-specific-gravity# on Jan. 6, 2020.

Russet Burbank Potato Properties, downloaded from http://www.agroplant.nl/en/variety/russet-burbank/ on Jan. 4, 2020.

* cited by examiner

METHOD FOR THE PREPARATION OF INSTANT STIR-FRIED POTATO STRINGS

The invention relates to a method for the preparation of pre-packaged instant stir-friable potato strings also known as tudousi, used in the oriental kitchen.

At present, tudousi is prepared for direct consumption by stir-frying freshly prepared, often hand-cut potato strings in portions that meet the daily requirements. These prepared strings have a small cross sectional area of 25 $mm^2$ or less and in general do not have a shelf life. Tudousi can only be kept in the refrigerator for about a day because of quick discoloration (by loss of native colour and/or after-cooking darkening) and development of off-flavours. Longer storage also often results in strings with soft and mealy texture that become a soft, granular and decomposing product upon stir-frying, instead of being intact strings with a bite and crispiness. The reason for the loss of texture and structure of the prepared potato strings is believed to be related to ongoing oxidation based deterioration processes in texture and structure upon preparation and associated to the intensity of the cooking process, the relatively small cross-sectional area of the potato strings, a large surface to volume ratio in the product, and a relatively high water loss. For this reason, only prepared potato strings having a relatively large cross sectional area of 40 $mm^2$ or more, also known as French fries, can be kept for more than a day in the refrigerator without losing texture significantly. Refrigerated storage of prepared raw potato strings without any heat treatment have no shelf life whatsoever because of rapid enzymatic deterioration and oxidation processes in the product.

In the art, there is no method available for the preparation of potato strings having a small cross sectional area of 25 $mm^2$ or less with a refrigerated shelf life. For French fries, methods are available to provide such fries with a refrigerated shelf life. For example, U.S. Pat. No. 3,355,299 describes the preparation of par-fried potato strips having a cross sectional area of over 40 $mm^2$ with an improved frozen shelf life. To this end, the potato strips are blanched in water of 70-75° C., followed by a deep frying step in oil at 130-160° C., whereafter the fries were frozen. The pre-treated frozen fries can be reconstituted by a three-step deep frying process in oil. This process is mainly designed to remove water from the fries in order to increase dry matter from an average range of 19-25% w/w % in raw potatoes to a level of 30-35 w/w % in par-fried fries. During preparation of French fries by deep-frying in oil, the dry matter content further increases to 50-60 w/w %. Oil/fat plays an indispensable role in the production process of French fries and creates the right texture and structure of French fries, ideally experienced as a crispy crust and a floury, creamy filling. Such a method is however not suitable for tudousi. In the art, production of French fries with a cross section area of below 25 $mm^2$ is avoided as these strips will become too variable for texture, structure and appearance characteristics and often fail to meet the market conform quality criteria. Moreover, these strings accumulate excessive fat/oil in the fries upon preparation in a deep-fry preparation process. Fat/oil is predominantly accumulated in the crust of fries and the content thereof increases with smaller cutting size and can reach 20 w/w % or higher at cross sections of 25 $mm^2$, resulting in unacceptable caloric value and oily taste.

This invention describes the production process of pre-packaged potato strings with extended shelf life comprising the heating of freshly cut potato strings having a small cross sectional area of 25 $mm^2$ or less and flash cooling, i.e. blast chilling the heated strings. These potato strings have a refrigerated shelf life (i.e. capable of being kept at a temperature below 10° C., in particular at refrigerator temperature of 4-10° C., preferably at about 4-7° C., or frozen, for multiple days), and can be stir fried after being stored for e.g. 24 hours or longer while resulting in a stir fried potato product (tudousi), comparable with and not discernible from a stir fried potato product from freshly cut potato strings. To this end, the invention relates to a method for the preparation of pre-packaged instant stir-fried potato strings having a refrigerated shelf life before stir-frying, comprising the steps of:
  a. Providing potatoes,
  b. Cutting the potatoes of step a) in strings having a cross-sectional area of 25 $mm^2$ or less,
  c. Heating the potato strings of step b) to a temperature of 140° C. or less,
  d. Blast chilling the heated potato strings of step c) to 10° C. or less,
  e. Packaging the potato strings after step b), c) or d) or during step d), the method being free of contacting the potato strings with oil. It has been found that when contact between the potato strings and oil during the preparation process is avoided, potato strings can be obtained wherein the dry matter content does not significantly increase, and that have refrigerated shelf life while maintaining the required qualities such as texture, integrity and structure. The claimed method is therefore oil free, meaning that the potato strings are not contacted with oil as from the moment the potatoes are cut into strings until after blast chilling and packaging of the strings, preferably until the strings are subjected to a stir-frying step.

The potatoes are preferably peeled before or during the cutting step b). Peeling of the potatoes can e.g. be performed and automated with any knife or abrasive based peeler at room temperature, but not by heat operated peelers, to avoid heat pre-treatment on the tubers during the production process prior to the cutting of potato strings. It is also possible however to provide the potatoes unpeeled, but preferably at least washed.

Cutting of the potato strings can be performed by any suitable device and can be automated. Although the cross sectional area of the potato strings can have any form, such as round, rectangular or irregular, a square form is preferred as this form minimizes losses in cutting of the potatoes. A cross-sectional area of 25 $mm^2$ or less clearly discriminates the strings from any known potato product such as French fries.

Preferably, the cut potato strings are washed, to remove excess of starch.

The cut potato strings are heated as pre-treatment. Preferably after washing. Without such, preferably immediate, heating step, i.e. in case cut potato strings are kept refrigerated without heating pre-treatment, stir frying such refrigerated strings does result in an inferior product with poor texture and appearance. The strings will deteriorate fast in terms of colour, texture and flavour due to triggered oxidation processes upon cutting. Heating can take place e.g. by blanching the potato strings in boiling water, or by steaming at a higher temperature, or by any other suitable heating method known in the art. The term 'blanching' is intended to mean the heating of the potato strings with hot water or steam to obtain a product with optimal colour, taste, texture and appearance upon packaging and storage in refrigerated conditions during their shelf life period. To this end it is important that the potato strings, having the right dimensions as defined herein, are brought in a sufficient volume of hot water or steam so that optimal heat exchange between the potato strings and the hot water can take place. The higher the heating temperature, the shorter the heating is usually to be performed. For example, if blanching in boiling water is chosen as heating method, the heating time may e.g. vary between 30 seconds and 4 minutes, which can be determined by the skilled person. When the strings are heated by steam of e.g. 120° C., the heating time will be less, e.g. 15 seconds to one minute. The minimum temperature for effective blanching is preferably 60° C., more preferably 70° C., even more preferably 80° C. and typically the minimum temperature is in the range of 80-90° C. for a product with good texture, shelf life and microbiological specifications. It has however been found that the dry matter content of the potato strings should preferably not be higher than 20 w/w %, preferably be between 16-19 w/w % during the preparation method. It was found that during the method of the invention, the dry matter content in the potato strings does not significantly change upon potato string production as compared with that of the potatoes provided, meaning that the dry matter content may vary during the method by ca. 0.5 w/w %. It is believed that such maintenance of the dry matter content, in contrast to the method for the preparation of French fries, is important for the obtained refrigerated shelf life of the potato strings and final consumption quality upon preparation.

Heating is preferably be performed by contacting the potato strings with water or steam of the envisaged temperature.

Importantly, the potato strings are blast chilled after heating in particular to prevent overcooking of the product. The terms 'blast chilling' and 'flash cooling' have identical meanings and are therefore interchangeably used herein, and are intended to mean that the potato strings are cooled fast to 10° C. or less, i.e. within 25 minutes, preferably within 15 minutes, even more preferably in 10 minutes or less, still even more preferably in 8 minutes or less, still even more preferably in 6 minutes or less and most preferably in 5 minutes or less. Although the above definition prevails, a more general definition of blast chilling is e.g. given in the Brochure NJB0497 Blast Chill Freeze and Thaw Blue Paper November 2009, retrievable from the website www.foster-refrigerator.co.uk The potato strings are contacted with a cooling medium, which can be any suitable cooling medium, preferably a fluid, such as a cooling gas or liquid, e.g. cold air or water. A cooling gas, in particular cold air is preferred. To optimize cooling, the heat exchange surface between the potato strings and the cooling medium is preferably as large as possible. Preferably, the surface of the potato strings is fully contacted with the cooling medium, e.g. by submersion in a rather large volume of cooling medium in order to minimize contacting of the potato strings with one another during cooling. The temperature of the cooling medium can be the same as, or lower than the temperature whereto the potato strings are to be cooled. When a faster flash cooling is preferred, the temperature of the cooling medium can accordingly be chosen lower than the temperature whereto the potato strings are to be cooled. However, in a preferred embodiment, the temperature of the cooling medium is the same as the temperature whereto the potato strings are to be cooled.

During the process, the potato strings are packaged. Packaging can take place after cutting before the heating step, so that the potato strings are heated and subsequently flash cooled in packaged conditions. Special cooking bags can be used for packaging, as e.g. are used to package single rice portions, allowing proper heating of the packaged potato strings. Packaging can also take place during or after flash cooling.

Herein, the term stir-frying is intended to mean frying at elevated temperature, preferably in oil, wherein, on weight basis, the amount of oil is lower than the amount of the product, in casu the potato strings, to be fried. During frying, the product is stirred, e.g. manually using a wooden spoon or the like. The oil has a temperature of preferably 160-260° C., preferably 220-240° C. The amount of oil, on weight basis, is preferably 1-20% of that of the potato strings, most preferably 2-5%.

The potato strings preferably have a uniform cross-sectional area, preferably over the entire length of the strings. In order to produce potato strings for use in the method of the invention, potatoes are usually cut, in the natural length direction of the tubers, by passing these through a sharpened grid, resulting in a uniform length of the strings. This in contrast to potato bits used for e.g. the food product rösti, known in Swiss cuisine.

In a preferred embodiment, the potato strings in step b) are cut to a cross-sectional area of 20 mm$^2$ or less, preferably 16 mm$^2$ or less, more preferably of 10 mm$^2$ or less, most preferably of 7 mm$^2$ or less. The said cross-sectional area is preferably at least 3 mm$^2$, more preferably at least 4 mm$^2$ and most preferably at least 5 mm$^2$. When the cross-sectional area becomes too small, the strings have a too large surface to volume ratio and will tend to burn or become overcooked when stir-fried. The larger the cross-sectional area, the more difficult it becomes to produce a stir fried product that is well done.

Preferably, the potato strings are cut, preferably in the natural length direction of the tubers, in step b) to have a rectangular cross-sectional area, preferably a square. As indicated above, cutting into such strings results in less material losses than when cut to cylindrical strings, i.e. a circular cross sectional area. A square form is preferred for practical and economic reasons.

Preferably, at least 80%, preferably at least 90% and most preferably 95% or more of the potato strings in step b) have a length of 30-150 mm, preferably 40-130 mm. Potato strings below 30 mm may result in an incoherent product when stir-fried, whereas strings above 150 mm may result in an over-tangled product during stir-frying, which is difficult to divide into practical portions.

In a preferred embodiment, the method comprises, after the flash cooling step d), a step f) of storing the potato strings at a temperature at or below 10° C. The storage temperature is preferably the same as the cooling temperature, i.e. the temperature whereto the potato strings are cooled during flash cooling.

The refrigerated shelf life of the potato strings obtained as described above before stir-frying is preferably at least 24 hours, more preferably at least 48 hours even more preferably at least 72 hours, still even more preferably at least one week, most preferably at least 10 days or about two weeks. By applying the method of the invention, shelf lives in this order can be obtained. The refrigerated shelf life is to determine when storage takes place at typical standard refrigerator conditions in the potato product chain for prepared potato products (e.g. from producer to retail and from retail to in-home situations), i.e. between 4 and 6° C. The shelf life of the potato strings at freezing conditions, e.g. at −15° C.-−20° C., is even higher than when kept between 4 and 6° C.

The skilled person will be capable to select the proper heating parameters for potato string heat treatment such as temperature, heating time and the way of heat transfer, such as by incubation of the potato strings in hot water or by treatment with steam, all as function of scale of production and processing equipment available. Preferably, potato strings should meet particular texture requirements after the heating process, before being blast-chilled and packaged. To this end, in step c) the heating is chosen such, that a texture measurement on the heated potato strings after step c) according to the following protocol:

i. loading 160 g of heated potato strings having a cross sectional area of 2.5×2.5 mm, of which at least 90% has a length of 30-150 mm, directly after the said step c) in a chamber having a top and a bottom wall, a height of 40 mm, a length of 100 mm and a width of 70 mm, which top wall has 3 slits, each having a length of 65 mm and a width of 5 mm, the slits having a distance of 2 cm to one another and oriented in parallel to one another, and perpendicular to the axis of the chamber, ii. closing the chamber, iii. moving sequentially through each slit in vertical direction towards the bottom wall of the chamber with a speed of 1.0 mm/s over a distance of 24 mm, a probe cutting blade having a lower cutting portion having length of 60 mm and a height of 5.7 mm between a lower side and an upper side thereof, at said lower side a lower sharp cutting edge being arranged having a length of 53 mm, flanked by rounded edges, the upper side of the cutting portion being adjacent to a lower side of a blade portion, the length thereof rejuvenating over a height of 34 mm to an upper side having a length of 46 mm and a thickness at the upper side of 2 mm, the thickness of the blade portion rejuvenating from the upper side thereof with an angle of 1° between the front and back side thereof towards the cutting portion, said cutting portion rejuvenating from the upper side thereof with an angle of 6° between the front and back side thereof to the lower sharp cutting edge with a calibrated sharpness of 2.08-2.44 N, iv. during said moving, measuring the resistance force exerted on the blade as soon as the said force exceeds a threshold of 0.49 N, steps i.-iv. being performed at 60° C., v. repeating steps i.-iv., resulting in 6 measurements, vi. calculating the parameters Fmax (maximum average resistance force) and SA (average surface area, defined as the surface under a graph, reflecting the resistance force curve in time during each measurement of steps iv.) from the 6 measurements wherein outlier values outside the 95% confidence interval by variance analysis (ANOVA) are excluded from the calculation, results in an Fmax of at least 12 N above the threshold, and SA of at least 130 Ns.

When the potato strings fulfil the above texture requirements, it has been found that an optimal stir-fried potato product can be obtained having optimal texture qualities such as bite and crispiness after being stir-fried, while having a required refrigerated shelf life. In a first step of the texture measurement, the heated potato strings are allowed to cool down to 60° C., and 160 gram are weighted and put evenly in the container which is subsequently closed. The texture measurement, i.e. steps i.-iv. are performed at 60° C., preferably in a thermostatised room, such as a Peltier cabinet wherein the temperature is regulated to be 60° C. The closed container is preferably at 60° C. Once the potato strings are loaded in the chamber, the chamber is closed and a probe blade of the above described dimensions and sharpness is moved with a constant speed of 1.0 mm/s through the slits and through the potato strings for 2.4 em, confined in the chamber. The sharpness is defined by the average of 6 values, obtained by double measurements at three locations on the sharp cutting edge of the blade being uniformly sharpened, i.e. at the middle of the cutting edge between the rounded edges (at 2.65 mm from both edges) and at 1.8 mm from the said middle towards both rounded edges. The measurements are to be performed by using a CATRA Razor Edge Sharpness tester (REST) (CATRA, Henry Street, Sheffield, S3 7EQ, UK) and by applying the suppliers' calibration protocol, the detailed principles of the said standardized test protocol being in the following link (herein incorporated by reference): www.catra.org/pages/products/kniveslevel1/st.htm, resulting in a sharpness in the above range of 2.08-2.44 N.

As soon as the resistance force of the probe blade reaches a threshold of 0.49N, the said force is registered while the blade continues to move through the confined potato strings. The maximum force is an indication of the crispiness. If the maximum force is too low, it has been found that the resulting stir-fried product after storage gives a too weak, mealy and spongy product. When a force-time curve is produced in a graph showing the resistance force, exerted by the confined potato strings to the probe blade in time, the Fmax reflects the bite or firmness of the potato strings while the SA (surface under the curve) is associated to the amount of labour needed to disintegrate, chew and clear the product upon consumption. If the SA value is too low, the strings are too soft and overdone relative to the target texture profile, which has been found to result in a stir-fried product of bad texture. A total of 6 texture measurements are obtained per potato strings sample, comprised of two triplicate observations on a replicate product sample. Outlier values outside the 95% confidence interval by variance analysis (ANOVA using GenStat $14^{th}$ Edition software) are excluded from the calculation. Preferably, at most 2 of the 6 calculated values are outside the 95% confidence interval. If more than 2 of the 6 calculated values are outside the said confidence interval, the desired texture requirements are not met. The Fmax is at least 12, preferably 13 N, most preferably 14 N above the threshold. The SA is at least 130 Ns, preferably at least 140 Ns.

If the above texture requirements are met, proper heating conditions are therewith identified to perform the method of the present invention to arrive at ready-to-use potato strings having a refrigerated shelf live for the preparation of tudousi by stir-frying the refrigerated potato strings. The skilled person is free to choose the heating procedure he prefers, as long as, in this preferred embodiment, the texture values are met.

In another preferred embodiment, the time T to reach a first peak on the time-force curve during a texture measurement is 14-21 s, preferably 15-20 s. The time to reach the first peak is an indication about the packing quality of the product in the container. If the first peak is reached too early, i.e. before 14 s, it is an indication that the product is packed too dense or uneven resulting in first peak values before 14 s. If the first peak is realized late in the cycle, i.e. after 21 seconds it is an indication that the container is filled too loose with strings with late first peak timing as result. If time T is outside the above range of 14-21 s, or preferably outside 15-20 s, the texture measurement should be repeated by reloading the chamber more evenly, as otherwise, the average resistance force as calculated in step vi. will be unreliable.

In another preferred embodiment, the time T to reach Fmax during a texture measurement is 15-24 s. The process of movement of the probe blade through the confined potato strings takes 24 seconds, so the Fmax should preferably be realised relative late during the measurement as force builds gradually up to its maximum during the texture measurement process. The Fmax of a strings sample and the time T to reach this value are dependent on two principles, (1) the texture of the product in terms of soft to firm and (2) the quality of the packing of the product in the container in terms of (un)even density. With respect to texture, typical Fmax values between 5-25N can be observed for ready-to-use potato strings, values that are realized between 15 and 24 seconds in the test protocol if the strings are properly evenly packed. An initial hard bite is experienced at Fmax values above 20N, associated with a relative raw or under processed product. Such a bite is less desired for the potato strings of the invention. The same is true when the Fmax is below 12N, indicating an initial soft overcooked texture.

Preferably, the potato strings in step c) are heated to 120° C. or less, preferably to about 100° C. (the term 'about' would allow a temperature variation of 5° C. around the indicated value, preferably of 3° C., more preferably 1° C. and most preferably 0° C.). It has been found that at higher temperatures, the heating time is usually short, i.e. below 1 minute, which makes the process to be performed on industrial scale more complicated. The risk of over cooking is relatively high, resulting in a too soft texture. The potato strings in step c) are preferably heated to at least 60° C., more preferably to at least 70° C., even more preferably to at least 80° C.

In step c) of the method of the present invention, the heating time is preferably 360 s. or less, more preferably 240 s. or less, even more preferably 60 s. or less. Shorter times are possible, but from an industrial feasibility point of view, less desired, as explained above. The heating time is preferably at least 30 s., more preferably at least 50 s. Preferably, the potato strings in step c) are blanched in boiling water, in particular for 1 minute, or by steam. Good results are obtained when 1 kg of potato strings are blanched during 1 minute in 26 litre of boiling water. However, it should be noted that the texture values Fmax and SA preferably comply with the above values.

It is to be understood that the step of blast chilling, or flash cooling, is preferably performed for 10 minutes or less, more preferably for 8 minutes or less, even more preferably for 6 minutes or less, and most preferably for 5 minutes or less. In a preferred embodiment, blast chilling takes place above the freezing point. In a preferred embodiment, in step d) the heated potato strings are blast chilled to 7° C. or less, preferably to 3-5° C., i.e. at a temperature of common household and industrial refrigerators. blast chilling can be performed in any way known to the skilled person, and suitable flash cooling or blast chilling instruments are known, for example those of Foster, UK. Flash cooling is necessary to stop the cooking process in the strings in order to avoid the strings to become too soft, resulting in impaired shelf life and texture of the stir-fried product. In industrial processes, flash cooling can be very fast e.g. by using liquid nitrogen or solid $CO_2$ (so-called dry ice) to generate an air flow of very low temperature. In such a case, the time can be reduced to several seconds. In case the product is frozen as a result of blast chilling, the process is also called 'blast freezing'.

In another preferred embodiment, the strings are blast chilled, i.e. blast frozen below the freezing point of water, preferably below −5° C., particularly between −10° C. and −25° C.

For optimal cooling, the step of blast chilling or blast freezing preferably comprises contacting the potato strings with a forced stream of cooling fluid, such as cooling gas or air, preferably having a temperature of +2° C. to −30° C.

The potato strings preferably have a dry matter content of between 16 and 19 w/w % during the steps of cutting, heating and blast chilling. It has been found that maintaining the dry matter content within this range, results in tudousi with refrigerated shelf life and optimal texture, structure and integrity properties. This is preferably achieved by avoiding oil contact with the potato strings until stir-frying, or at least to minimize contact with oil. Preferably, potatoes having a dry matter content of between 16 and 19 w/w % are provided for the preparation of potato strings according to the invention.

In still another preferred embodiment, the strings are further dried, such as freeze-dried, to a dry matter content of at least 90 w/w %, preferably at least 95 w/w %, most preferable at least 98 or 99 w/w %. This results in a prolonged shelf life without the need for refrigeration. Drying can take place in any suitable drying equipment known to the skilled person. Before use, the dried potato strings can conveniently be rehydrated.

Preferably, the temperature of the flash cooling step d) is the same as the storage temperature of step f). When flash cooling takes place at e.g. 4-6° C., the potato strings are preferably stored under the same refrigerated conditions until further use. Further use can e.g. be selling of the product to a consumer, or stir-fry the stored product to ready-to-consume tudousi. However, if the potato strings are to be kept below 0° C., e.g. between −10° C. and −25° C., flash cooling can advantageously be performed at such low temperatures.

In step e), the potato strings are preferably packaged and sealed in plastic containers, preferably, plastic bags. However, any suitable container can be used. The packaging step e) can be performed after the cutting step and before the heating step, as indicated above, or after the heating step before the flash-cooling step d). However, the packaging step e) is preferably performed after or during flash-cooling step d).

In step f), the packaged potato strings are preferably stored at a temperature at or below 7° C., preferably at or below 5° C., most preferably above the freezing point. In another embodiment, the packaged potato strings are stored at a temperature below −5° C., preferably between −10° C. and −25° C.

In step f), the packaged potato strings are preferably stored for a period of 24 hours or more, more preferably for 48 hours or more, even more preferably for 72 hours or more, still even more preferably for 1 week or more, most preferably 10 days or for about two weeks. The shelf life of potato strings prepared according to the present invention allows for such storage time periods, preferably at refrigerated temperatures below 10° C.

The texture of the potato strings after being stored for the above-indicated time periods is preferably not impaired during the storage. To this end, at least for one of texture parameters Fmax or SA as defined above, or for both Fmax and SA, the potato strings have the same value(s) after one or more of the above-indicated storage time periods as measured after heating as described above.

The invention also relates to a method for the determination of suitability of a batch of potatoes of a variety or different varieties to be used in the method for the preparation of instant stir-fried potato strings having a refrigerated shelf life before stir-frying as described above. In this method, the texture of potatoes is tested after a defined heating step of 3 minutes blanching in boiling water, wherein preferably 1 kilogram of cut potatoes, comprising the following steps:

A) providing peeled potatoes,
B) cutting the peeled potatoes in strings with a cross sectional area of 2.5×2.5 mm, of which at least 90% has a length of 30-150 mm,
C) blanching the said potato strings in boiling water during 3 minutes,
D) loading 160 g of the blanched potato strings in a container having a top and a bottom wall, a height of 40 mm, a length of 100 mm and a width of 70 mm, which top wall has 3 slits, each having a length of 65 mm and a width of 5 mm, the slits having a distance of 2 cm to one another and oriented in parallel to one another, and perpendicular to the axis of the chamber,
E) closing the chamber, moving sequentially through each slit in vertical direction towards the bottom wall of the chamber with a speed of 1.0 mm/s over a distance of 24 mm, a probe cutting blade having a lower cutting portion having length of 60 mm and a height of 5.7 mm between a lower side and an upper side thereof, at said lower side a lower sharp cutting edge being arranged having a length of 53 mm, flanked by rounded edges, the upper side of the cutting portion being adjacent to a lower side of a blade portion, the length thereof rejuvenating over a height of 34 mm to an upper side having a length of 46 mm and a thickness at the upper side of 2 mm, the thickness of the blade portion rejuvenating from the upper side thereof with an angle of 1° between the front and back side thereof towards the cutting portion, said cutting portion rejuvenating from the upper side thereof with an angle of 6° between the front and back side thereof to the lower sharp cutting edge with a calibrated sharpness of 2.08-2.44 N,
F) during said moving, measuring the resistance force exerted on the blade as soon as the said force exceeds a threshold of 0.49 N, steps D)-F) being performed at 60° C.,
G) repeating steps D)-G), resulting in 6 measurements,
H) calculating the parameters Fmax (maximum average resistance force) and SA (average surface area, defined as the surface under a graph, reflecting the resistance force curve in time during each measurement of steps G) from the 6 measurements wherein outlier values outside the 95% confidence interval by variance analysis (ANOVA) are excluded from the calculation,
I) determine the potatoes as suitable if the Fmax is at least 12 N above the threshold, and the SA is at least 130 Ns.

The same steps (including those for the determination of the sharpness of the cutting blade) are performed as the previously described texture test to determine proper heating conditions, but now with a predetermined heating step, in order to test the suitability of potatoes as starting material for potato string production. For example, potatoes with a floury cooking behaviour are not very well suited to be used as starting material for the method of the present invention. On the other hand, some batches of potato varieties that can be very suitable to be used in the present method, can be less suitable, due to environmental conditions like certain weather conditions during growth of the potatoes, or storage conditions of the potatoes. Therefore, a suitability test is preferably performed before potato strings according to the present invention are made. Blanching step C) is performed on 1 kg of the potato strings in 26 litre of boiling water. Suitable potatoes, determined according to the above-described method, are therefore advantageously blanched for 1 minute in boiling water when strings with refrigerated shelf life according to the invention are to be made.

Again, the time T to reach the first peak on the curve is preferably 14-21 s, more preferably 15-20 s, the time T to reach Fmax is preferably 15-24 s, and the Fmax is preferably at least 13 N, more preferably 14 N above the threshold, and the SA is preferably at least 130 Ns.

According to the methods of the invention, the potatoes of step a) preferably have a dry matter content, expressed as specific gravity, of between 1.040 and 1.080 g/ml, preferably between 1.045 and 1.075 g/ml, more preferably between 1.050 and 1.070 and preferably have a value of 1-4 on the 1-7 waxy/floury scale (Ochsenbein et al., J. Texture Studies 41 (2010) 1-16), more preferably of 1-3, even more preferably of 1-2 and most preferably of 1, meaning that suitable potatoes are waxy. The potatoes of step a) preferably originate from a variety, chosen from the group, consisting of Amandine (CVP019950969, EU2504), Annabelle (CVP019990634, EU6935), Franceline (CVP019952868, EU 175), Marilyn (CVP020042380, EU 17273), and varieties derived therefrom. The numbers between brackets refer to corresponding plant breeders rights. It has been shown that by using these varieties, a very attractive stir-fried product can be produced, with very good firmness and crispiness after being stir-fried. It is to be noted that potato varieties for French fries have more floury characteristics and have a higher dry matter content, with a specific gravity of 1.078 or more. Potato varieties having a lower dry matter content have shown to result in undesirable fries having impaired texture properties. For tudousi, in contrast, potato varieties having lower dry matter content are preferred.

The invention also relates to potato strings, obtainable by the method as described above for the preparation of instant stir-fried potato strings having a refrigerated shelf life before stir-frying.

The invention further relates to a method for the preparation of stir-fried potato strings, comprising the step of stir-frying the potato strings, as obtained by the method according to the invention for the preparation of instant stir-fried potato strings having a refrigerated shelf life before stir-frying.

The potato strings are preferably stir-fried in oil, wherein the amount of oil, on weight basis, is preferably 1-20% of that of the potato strings, most preferably 2-5%.

The invention will now be described by way of the following non limiting examples and figures, wherein.

Figure 1:
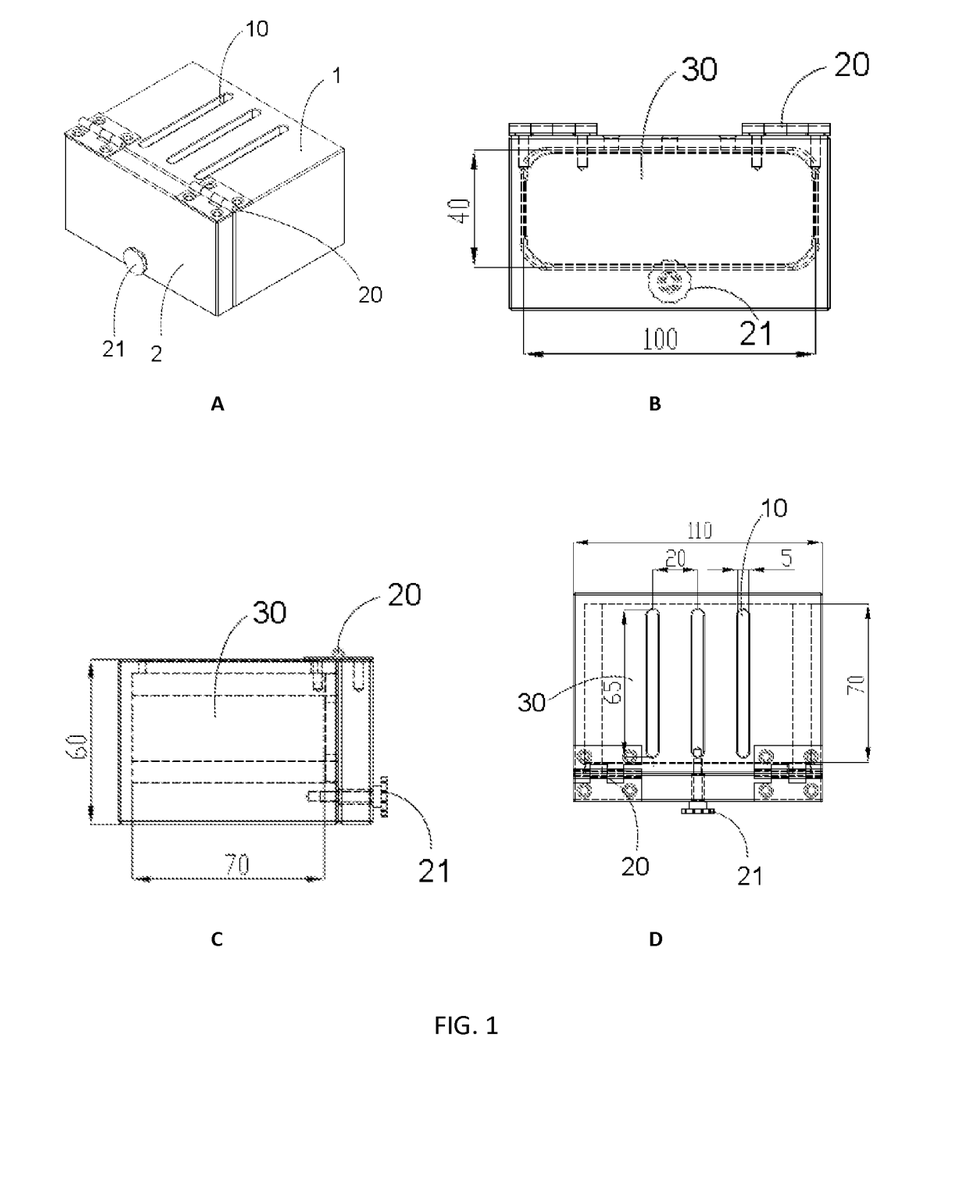
FIGS. 1A-D show different views of a chamber used to perform texture measurements to check whether a batch of potatoes is suitable to be used for the preparation of instant tudousi, or to check whether heating conditions are properly chosen.

FIG. 1A shows housing 1 of a test chamber having a lid 2, with hinges 20, allowing proper opening and closing of the lid 2. Screw cap 21 secures closing of the lid 2. In the housing, three slits 10, arranged in parallel, are present. FIG. 1B shows a cross section, parallel to the lid through the housing with an indication of the dimensions in mm through the test chamber of FIG. 1A, showing screw cap 21 and hinges 20. A cavity 30 for receiving potato strings is depicted by 30. The said cavity has a height of 40 mm and a length of 100 mm. In FIG. 1C, a cross section perpendicular to that of FIG. 1B is shown, again showing hinge 20, screw cap 21 and cavity 30. The width of cavity 30 is 70 mm. FIG. 1D shows a cross section, parallel to slits 10 through the housing, showing screw cap 21 and hinges 20. The slits have a length of 65 mm and a width of 5 mm, and are spaced 20 mm from one another. In use, the lid 2 of the test chamber is opened and 160 gram of potato strings is evenly loaded in the chamber. The lid 2 is closed by turning cap 21. In order to improve the even loading of the potato strings, the chamber can be slightly shaken and knocked on a flat support surface such as a work bench or table.

FIG. 2A shows a drawing of a probe cutting blade showing the front side, defining the length and height of the probe cutting blade and the side, perpendicular thereto defining both the height and the thickness of the probe blade, the probe cutting blade having a lower cutting portion 31, of a blade portion 3 and of an upper mounting portion 320. Side views 2B (from the front) and 2C (from the side), wherein the dimensions are indicated in mm, show the same probe blade having a lower cutting portion 31 having length of 60 mm and a height of 5.7 mm between a lower side and an upper side thereof, at said lower side a lower sharp cutting edge being arranged having a length of 53 mm, flanked by rounded edges, the upper side of the cutting portion being adjacent to a lower side of a blade portion 3 rejuvenating over a height of 34 mm to an upper side having a length of 46 mm (i.e. having a rejuvenating angle with the lower sharp edge of 80°), and a thickness at the upper side of 2 mm, adjacent to an upper mounting portion having a constant length of 46 mm and thickness of 2 mm, the thickness of the blade portion 3 rejuvenating from the upper side thereof with an angle of 1° between the front and back side thereof towards the cutting portion, said cutting portion rejuvenating from the upper side thereof an angle of 6° between the front and back side thereof to the lower sharp cutting edge.

The dimensions of the mounting portion are not particularly relevant, as long sufficient surface is provided for a cutting device to hold the probe cutting blade.

The cutting edge of sharp cutting portion 31 has a sharpness of 2.08-2.44 N, determined as described above. Such a probe blade is to be used when texture measurements are to be performed according to the present invention.

During a texture measurement, the cavity 30 of the test chamber 1 loaded with a predetermined amount of heated potato strings, and a probe blade as defined above, starting with the sharp edge portion 31 is passed through the slits 10 of the chamber 1 with a predetermined speed for a predetermined time period.

It is known to a skilled person in texture analysis that data generated by texture protocols is not only a function of the product tested but also dependent on the design, dimensions and condition of the instrument, probe and sample container as functional unit for the measurements. Proper and correct use of the texture analyser, probe and sample container combination, good cleaning, regular maintenance and calibrations are basic requirements for the collection of reliable texture data. Small changes in probe and sample container dimensions and specifications, sample quantities or texture analyser settings may change the values of data obtained and let them deviate from the observations in the given examples. Deviations from the given experimental design in terms of dimensions, specifications, quantities and instrumental and software settings, however, may change absolute values of the texture parameters of interest but will not disturb the relative ranking of these texture parameters in the specified texture range of tudousi product for potato varieties. A skilled person in texture analysis can therefore standardize collected data from a texture analyser, probe, sample container combination that deviates from the described experimental design in this patent to the reference texture values obtained in this patent.

EXAMPLES

Example 1

Texture Measurement Protocol for Potato Strings

Potatoes of an envisaged batch of a potato variety are cut in axial direction to strings of 2.5×2.5 mm, having a length of 30-150 mm with a Halide RG200 vegetable cutter equipped with a 2.5×2.5 mm Julienne knife.

1 Kg of the strings of each variety are blanched in a Frymaster (Frymaster-E4 Electric Fryers RE17TC, 17 kW) with 26 litre of boiling water during 3 minutes. The strings are taken from the boiling water, freed from adherent water on a sieve, and 160 g thereof is immediately evenly loaded in a test chamber as described for FIG. 1, after which the lid of the chamber is closed.

Figure 2:
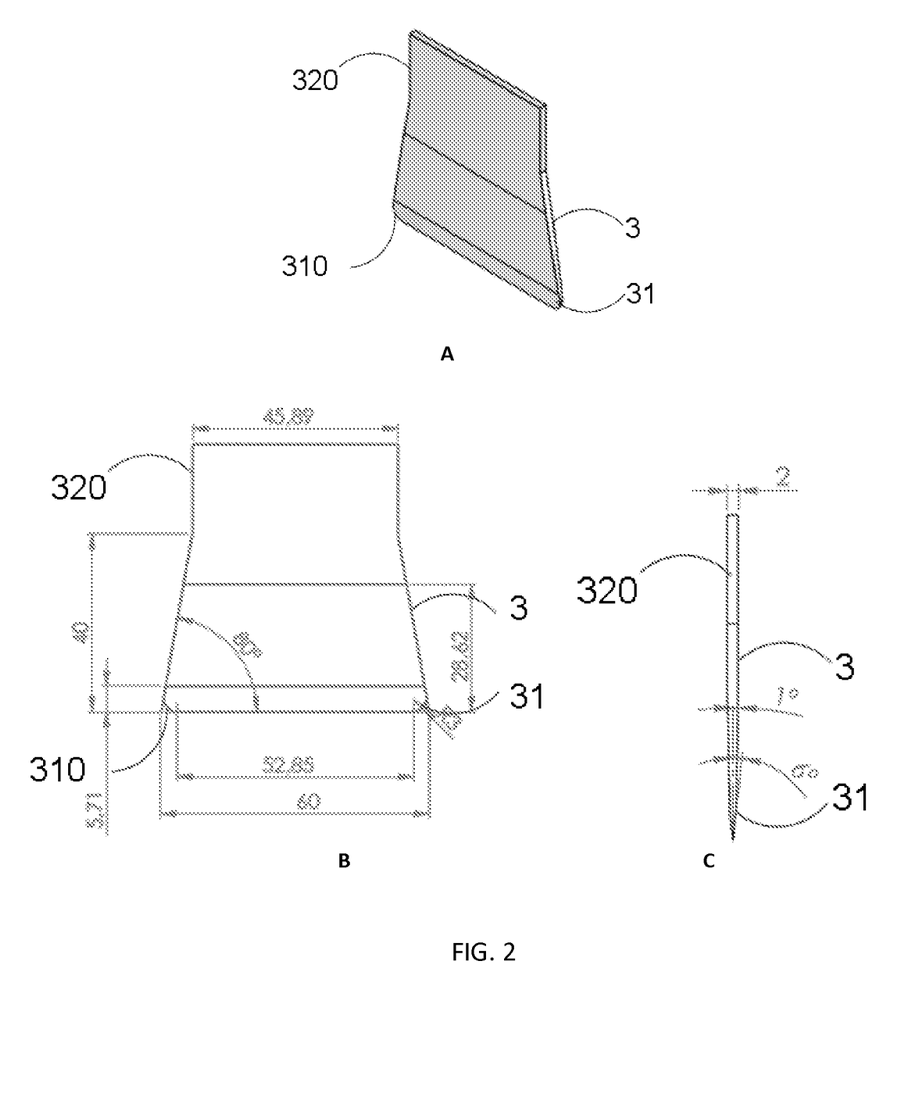
FIGS. 2A-C show a probe blade, used in the said texture measurement.

A probe blade as depicted in FIG. 2 is sequentially moved through each of the three slits of the test chamber in the direction to the bottom thereof, with a speed of 1 mm/s over a distance of 2.4 cm. During the movement of the probe blade through the chamber, the resistance force, exerted on the blade is recorded as soon as the said force exceeded a trigger threshold of 0.49N.

The moment when a maximum force Fmax is reached, $T_{Fmax}$, during the blade movement is recorded as well. To this end, the probe blade is mounted on a Stable Micro Systems TA-X2 Plus texture analyser with associated software (Exponent software version 4.0.9.0, XT Plus Version 0.01178) running in the compression mode at 1 mm/s.

Loading of the potato strings in the test chamber and moving the blade through the test chamber is performed at 60° C. in a Temperature Controlled Peltier Cabinet (XT/PC). This results in three recordings of the resistance force in time.

Figure 3:
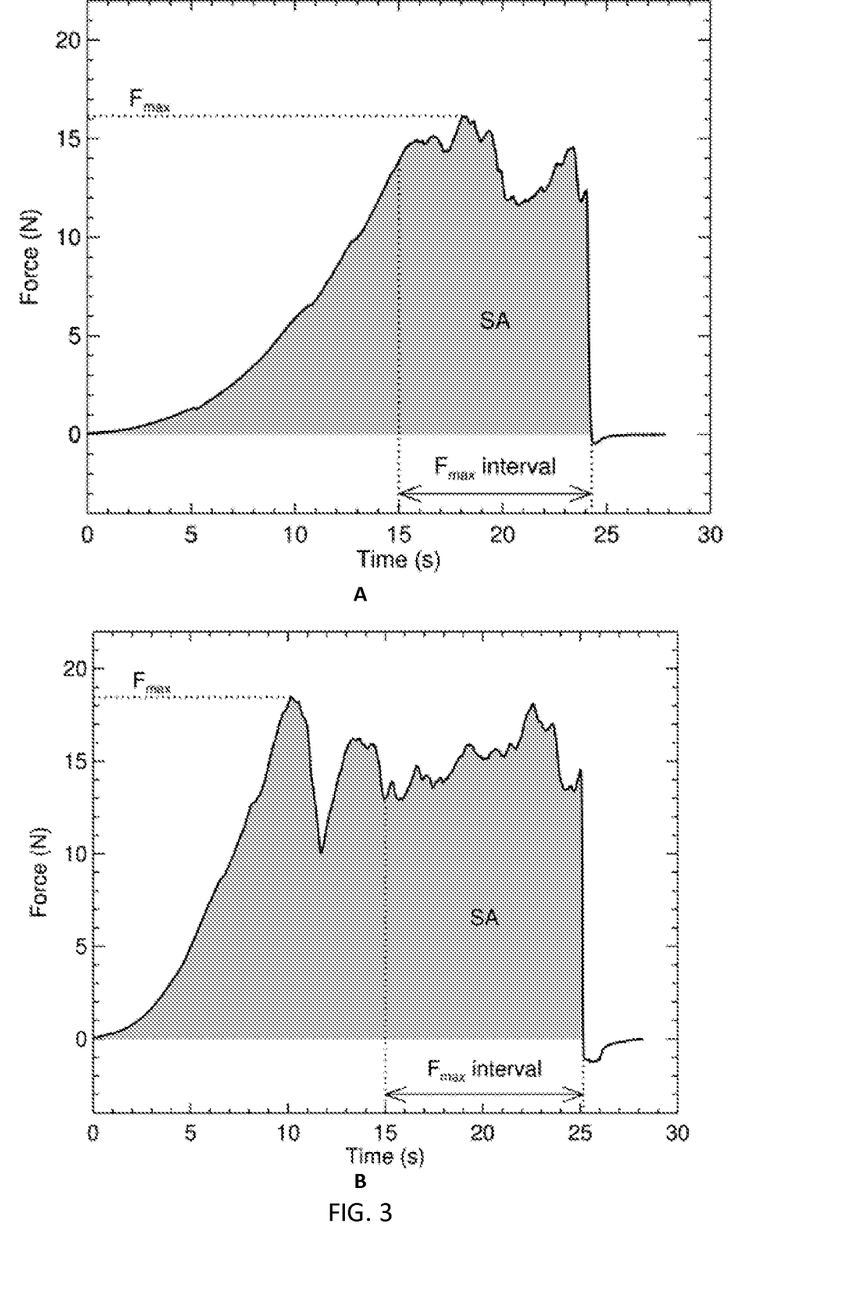
FIGS. 3A-C show graphs of texture measurements on a batch of potato strings of the same variety wherein the force needed to move the probe blade through the probe potato strings in the chamber (Y-axis) is shown in time (X-axis). showing examples of inferior and suitable texture profiles that are typical for tudousi products upon production.
Figure 4:
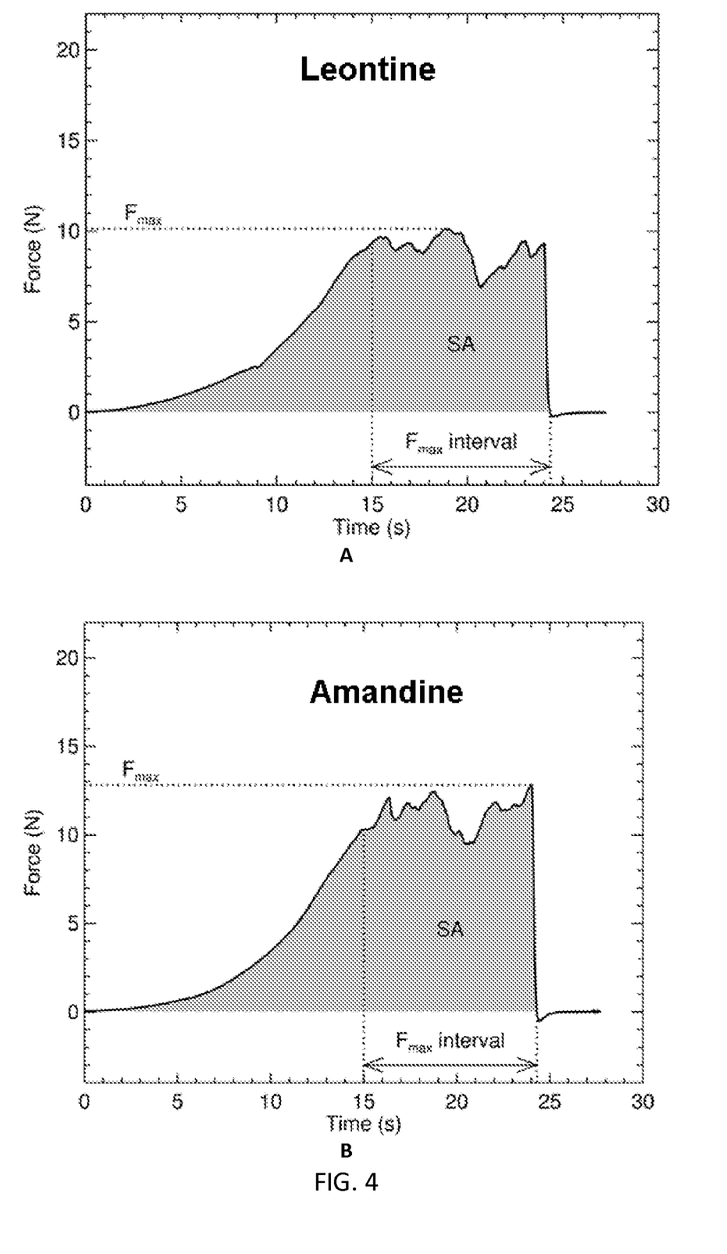
FIGS. 4A-F show graphs of such texture measurements on different potato batches from 6 different potato varieties.

The above was repeated, resulting in a total 6 recordings per sample of potato strings. Time-force traces of strings samples obtained by the texture analysis protocol with the SMS instrumental design of texture analyser, XT/PC cabinet and probe show typical patterns as shown in FIG. 3A-C, in this case for the variety Franceline. More than 90% of all curves obtained with the experimental design has the shape and pattern of FIG. 3A. An initial gradient in force between 0 and 15 seconds leads to a series of force peaks in the time frame between approximately 15 and 25 seconds. The gradient can be explained by a steady compression of the product by the probe until the product is fully trapped between the knife and the bottom of the container at about 15 seconds runtime. Then the knife starts cutting the strings that are encountered during the remaining runtime with typical spikes as result. The height of the force and associated parameters depend on the texture of the sample and will get further attention in examples 2 and onwards.

The time-force curves are interpreted by SMS software and a defined macro (see table 1) for this purpose into 4 descriptive texture parameters Fmax (the highest peak in the curve), the time to the first peak ($T_{fp}$), the time to Fmax ($T_{Fmax}$) and the surface area under the curve SA as measure for labour conducted during the run.

Despite the care taken during the filling of the container, uneven filling may occur within certain spaces of the container with too high or too low density of strings per unit volume as result. Above average density of strings may lead to curve shapes that differ from those with under average density. The texture analysis protocol therefore preferably comprises a quality control step to remove outlier curves from the 6 texture recordings per sample applying ANOVA analysis as QC tool for the interpretation and classification of the samples for tudousi quality criteria. Analysis of variance (ANOVA using GenStat 14$^{th}$ Edition software) on the data of the texture parameters from 6 time-force curves per sample, as a tool for quality control of collected data, reveals that a small number of curves yields aberrant texture data that significantly deviate from the mean values of the 6 observations at p=0.05 (95% confidence interval, 95% CI). The application of a one-factor ANOVA, as classical variance test, with variety as factor and the texture parameters Fmax or SA typically identifies outliers in the 6 observations per parameter outside the 95% CI according to the ratio between deviations of individual data values from the average (calculated as residues from the average) divided by 2×√(residual variance) from the ANOVA analysis table. Absolute ratio's=/>2 are outside the 95% CI, marked as outliers and removed from the data file prior to the calculation of average Fmax (the highest peak in the curve), the time to the first peak ($T_{fp}$), the time to Fmax ($T_{Fmax}$) and the surface area under the curve SA values per sample. Root cause analysis resulted in the observation that the outlier data for the texture parameters were mainly originating from a curve shape with a low and late gradient in combination with a late first peak in the curve almost at the end of the runtime, between 24 and 25 s (FIG. 3C). In a number of cases a curve (FIG. 3B) with a steep force gradient and an early first peak earlier than 14 s is observed, leading to high SA type outliers. When measurement results as shown in FIGS. 3B and 3C are obtained, these measurements should not be included in the texture analysis. FIG. 3A shows a proper measurement, wherein the first peak is within the proper interval of 14-21 s.

Significant differences for the texture parameters Fmax, $T_{fp}$, $T_{Fmax}$ and SA are calculated with variance analysis (ANOVA) and expressed as LSD (Least Significant Difference) values at p=0.05 and presented below data tables if applicable. If data of more than 2, preferably more than 1 of the measurements have to be discarded according to the ANOVA analysis, the conclusion must be drawn that the packing of the potato string sample or samples was not evenly, and that sampling and measurements are to be repeated. In an exceptional case where despite even packing more than two measurements, preferably more than one of the measurements are to be discarded, the strings batch is outside specifications in that it contains a heterogeneous mix of strings that do not meet the quality criteria.

TABLE 1

Software macro settings for time-force curve interpretation in terms of Fmax, $T_{fp}$, $T_{Fmax}$, and SA.

| step | setting | unit/mode | R | F | ? | A | I | texure trait |
|---|---|---|---|---|---|---|---|---|
| Clear Graph Results | | | | | | | | |
| Redraw | | | | | | | | |
| Search Forwards | | | | | | | | |
| Go to Peak +ve Value | Force | | | | | | | |
| Set Threshold . . . Force | 25 | g | | | | | | |
| Mark Value Time | | | | | X | | | $T_{fp}$ (s) |
| Go to . . . Time | 0 | sec | | | | | | |
| Go to Abs. +ve Value | Force | N | | | | | | |
| Mark Value Force | | | | | X | | | Fmax (N) |
| Go to . . . Time | 0 | sec | | | | | | |
| Drop Anchor | | | | | | | | |
| Select Anchor | 1 | Anchor Not Activated | | | X | | X | |
| Go to Max. Time | | | | | | | | |
| Search Backwards | | | | | | | | |
| Go to . . . Time | 25 | sec | | | | | | |
| Drop Anchor | | | | | | | | |
| Select Anchor | 2 | Anchor Not Activated | | | X | | X | |
| Area | Active vs Active | | | | * | | | SA (Ns) |
| Redraw | | | | | | | | |
| Go to . . . Time | 0 | sec | | | | | | |
| Drop Anchor | | | | | | | | |
| Goto Abs. +ve Value | Force | N | | | | | | |
| Drop Anchor | | | | | | | | |
| Time Difference | | | | | * | | | $T_{fmax}$ (s) |
| Search Forwards | | | | | | | | |
| Go to Min. Time | | | | | | | | |

Example 2

Suitability Test of Potato Samples for Instant Tudousi Having Refrigerated Shelf Life For a producer of instant potato strings as input for instant tudousi, it is important to be able to assess whether or not envisaged potatoes are suitable to be used as starting material for the said tudousi or not. Performing the texture analysis of the present invention will provide an objective indicator for the suitability of a lot of ware potatoes from a certain variety for this purpose. The indicator has a good predictive power to ascertain that the ware potato lot concerned indeed will deliver a tudousi grade product at the end of the production process.

Potatoes of the varieties Amandine (EU2504), Annabelle (EU6935), Franceline (EU175), Marilyn (EU17273), Cecile (EU14664), Charlotte (NL005990), Leontine (EU21350) and Gourmandine (EU8902), the numbers between brackets referring to corresponding plant breeders rights as indicated above, were peeled and cut in axial direction to strings of 2.5×2.5 mm, having a length of 30-150 mm with a Halide RG200 vegetable cutter equipped with a 2.5×2.5 mm Julienne knife. Upon cutting the strings were washed twice in excess water (weight-water ratio 4) for the removal of starch granules that were liberated in the cutting process.

1 Kg of water washed strings of each variety were blanched in a Frymaster (Frymaster-E4 Electric Fryers RE17TC, 17 kW) with 26 litre of boiling water during 3 minutes. This preparation protocol represents quality control production circumstances to study if ware potato lot is suited for the production of chilled potato strings for retail and food chain use. After blanching, the potato string samples were taken from the boiling water, freed from adherent water on a sieve, and measured for texture using the texture protocol of example 1. Force-time curves of single measurements of the samples, as measured with the texture analyser protocol, from 6 of the 8 varieties covering the texture range are shown in FIG. 4A-F. The variety names of these examples are depicted in the figures. The time-force curves of the varieties show quite similar patterns to the first peak and peak time $T_{fp}$ in the curve in the 14-21 seconds range and the positioning of Fmax values in the 15-24 s time interval. Table 2 gives an overview of the average Fmax, $T_{fp}$, $T_{Fmax}$ and SA values of the 8 varieties after quality control by ANOVA.

TABLE 2

Predictive quality control protocol for tudousi suitability expressed as average parameter values of n = 6 measurements

| Variety | Fmax (N) | $T_{fp}$ (s) | $T_{Fmax}$ (s) | SA (Ns) |
| --- | --- | --- | --- | --- |
| Amandine | 12.0 | 18.1 | 23.0 | 141.0 |
| Annabelle | 15.2 | 18.6 | 20.1 | 178.2 |
| Cecile | 11.3 | 16.2 | 21.0 | 156.0 |
| Charlotte | 9.7 | 15.3 | 19.7 | 127.1 |
| Franceline | 12.0 | 19.1 | 22.5 | 146.3 |
| Gourmandine | 9.7 | 14.7 | 21.6 | 132.0 |
| Leontine | 8.5 | 14.9 | 19.4 | 115.8 |
| Marilyn | 14.1 | 18.4 | 22.9 | 175.4 |
| LSD p = 0.05 | 1.7 | 3.0 | 3.1 | 32.6 |

According to the texture protocol, the varieties Amandine, Annabelle, Franceline and Marilyn have an average Fmax of 12 N or more, and an average SA of above 130 Ns, indicating that these varieties, at least the tested batches thereof, have a high level of firmness according to the texture measurements and are suitable to be used in the method of the invention to prepare instant potato strings having refrigerated shelf life for tudousi.

Example 3

Sensorial Quality and Texture of Tudousi

Potatoes of the varieties Amandine, Annabelle, Cecile, Charlotte, Franceline, Gourmandine, Leontine and Marilyn as described in example 2 were peeled, cut into strings washed and blanched as described in example 2. However, blanching was performed for 1 minute. This protocol simulates the production of chilled potato strings for retail and food chain use.

The strings were taken from the boiling water, freed from adherent water on a sieve, and subsequently flash cooled to 4° C. within 5 minutes using a Hobart Foster BCF21 blast chiller. The chilled strings were stored at 4° C. in the refrigerator in 500 g plastic containers with plastic lid for 4 days.

Subsequently, tudousi was prepared from 200 g of the stored potato strings as follows for the purpose of sensorial appraisal of the samples by a trained panel for a list of sensory attributes.

A pan having a Teflon coating and a diameter of 30 cm was gas-heated for about 90 s, where after 5 ml rice germ oil was put in the pan and heating was continued for another 30 s, so that the temperature in the middle of the pan is about 240° C. At that moment, 200 g of stored potato strings of the invention is loaded in the pan, and stirred each 10 s. After another 30 seconds, i.e. 3 minutes after starting heating the pan, 5 ml of a salt solution (5 g table salt in 0.5 l tap water) was added. Stirring was continued each 10 s. Again 30 s later, the tudousi was put on plates, having a temperature of 65-70° C.

The prepared tudousi was used for sensorial profiling of texture, flavour and aroma attributes in order to get sensorial profiles of the samples relative to the desired tudousi target and the created texture data by the SMS texture analyser during the suitability test of example 2. To this end a 10 member expert panel from Sensory Dimensions (Reading, UK) was previously trained in 3 consecutive days for the consistent scoring of 12 appearance, texture, flavour and aroma attributes using potato strings samples with wide expression ranges for the attributes of interest. The trained panel was ultimately appraising the 8 tudousi samples from the varieties in a random order in duplicate according to best sensorial practice (blind, coded, uniform light, linear attribute scales) using Compusense (Compusense Guelph Canada) appraisal booths, attribute registration and interpretation software.

The tudousi samples were evaluated on 12 attributes (depth of yellow colour, crunchy, firm, moist, sticky, rate of breakdown, mouth clearance, oily mouth coating, raw potato, potato starch, oil, sweet) of which firm and crunchy were the two most differentiating criteria for the samples of the 8 varieties. The attribute rate of breakdown as parameter for disintegration of the product upon chewing also pulls samples apart. See table 3.

TABLE 3

Sensorial evaluation of tudousi

| Variety | Firm | Crunchy | Rate of breakdown |
| --- | --- | --- | --- |
| Amandine | 52.9 | 53.0 | 49.9 |
| Annabelle | 60.8 | 63.1 | 57.4 |
| Cecile | 48.9 | 49.8 | 45.3 |
| Charlotte | 54.8 | 57.4 | 47.1 |
| Franceline | 60.2 | 62.4 | 54.5 |
| Gourmandine | 48.5 | 48.3 | 43.6 |
| Leontine | 45.9 | 45.1 | 48.1 |
| Marilyn | 61.0 | 63.8 | 54.0 |

It can clearly be seen that in particular the varieties Annabelle, Franceline and Marilyn are high in the level of perceived firmness and crunchiness. This level of crunchy and firm texture is associated with longer rates of breakdown in the mouth. The data of the sensory attributes from table 3 correlate highly with the texture parameters from table 2 ($r^2$ between crunchy and/or firm vs. Fmax and/or SA of approximately 0.80) indicating that these sensorial attributes can be replaced by the texture parameters Fmax and SA as derived from measurements with a texture analyser during the suitability test.

Example 4

Shelf Life Test

Tudousi was prepared from the varieties Annabelle and Leontine as described above in example 3 and kept in plastic storage containers at 4° C. for different time periods. The product obtained from the differently stored potato strings was evaluated for texture with the SMS texture protocol as described in example 1 directly on the chilled product. Table 4 gives an overview of the texture parameters during a 12 days storage period, in line with the desired commercial 'best before' norm in retail and food service. The Annabelle product keeps its texture at optimal level in this time range while the Leontine product is deteriorating in time in particular for appearance related quality. Strips of Leontine develop a moist appearance, excrete and get suspended in released potato juice and slowly disintegrate in terms of structure and integrity. Potato strings of Annabelle in this example kept for up to 12 days at refrigerated conditions appeared to result in high quality tudousi, (data not shown).

Example 5

Determination of the Proper Heating Conditions

Strings as prepared above from the varieties Franceline and Leontine were heated in six different ways.

1: batch-wise blanching as described in example 1 for 1 minute

2: batch-wise blanching as described in example 3 for 3 minutes 3 batch-wise blanching for 5 minutes 4: continuous blanching at 90° C.

5: continuous blanching at 95° C.

6: continuous blanching at 99° C.

Table 5A describes the conditions of the 3 batch-wise processes and 3 continuous production processes for potato strings for the varieties Franceline and Leontine as described in example 2 at increasing heating intensities for the batch process (1 to 5 min blanching time) and the continuous process (blanching with water and steam at temperatures from 90 to 99° C.). These treatments are designed for the identification of the optimal heating time for the potato strings product according to batch and continuous production principles.

TABLE 4

Shelf life of Annabelle and Leontine potato strings measured in terms of texture parameters Fmax, $T_{fp}$, $T_{Fmax}$ and SA expressed as average parameter values of n = 6 measurements

| Storage | Annabelle | | | | | Leontine | | | | |
|---|---|---|---|---|---|---|---|---|---|---|
| time (day) | Fmax (N) | $T_{fp}$ (s) | $T_{Fmax}$ (s) | SA (Ns) | Appearance strips | Fmax (N) | $T_{fp}$ (s) | $T_{Fmax}$ (s) | SA (Ns) | Appearance strips |
| 0 | 17.1 | 19.1 | 20.2 | 171.2 | dry and intact | 12.6 | 16.1 | 19.4 | 128.8 | dry and intact |
| 1 | 17.2 | 19.2 | 20.3 | 170.4 | dry and intact | 12.1 | 16.1 | 19.3 | 126.9 | dry and intact |
| 2 | 16.9 | 18.9 | 20.1 | 171.5 | dry and intact | 11.7 | 15.9 | 19.1 | 125.1 | some moist and intact |
| 4 | 17.0 | 18.9 | 20.2 | 172.3 | dry and intact | 11.5 | 15.8 | 19.3 | 123.6 | moist and partly disintegrated |
| 8 | 16.6 | 18.5 | 20.0 | 168.6 | dry and intact | 10.6 | 16.2 | 19.2 | 115.4 | very moist and disintegrated |
| 12 | 16.2 | 18.4 | 20.0 | 167.4 | dry and intact | 10.1 | 15.9 | 18.9 | 109.4 | very moist and disintegrated |
| LSD p = 0.05 | 1.7 | 3.0 | 3.1 | 32.6 | | 1.7 | 3.0 | 3.1 | 32.6 | |

TABLE 5A

Process parameters in a batch and continuous production process of potato strings
critical process parameters

| nr | process | treatment | medium | temperature | quantity strings | energy input | primary steam/ water input | additional water input | total volume |
|---|---|---|---|---|---|---|---|---|---|
| 1 | batch | 1 min blanching | water | 100° C. | 1 kg/batch | 17 kW | 26 kg | 2 kg/hr | 26 l |
| 2 | batch | 3 min blanching | water | 100° C. | 1 kg/batch | 17 kW | 26 kg | 2 kg/hr | 26 l |

TABLE 5A-continued

Process parameters in a batch and continuous production process of potato strings
critical process parameters

| nr | process | treatment | medium | temperature | quantity strings | energy input | primary steam/ water input | additional water input | total volume |
|----|---------|-----------|--------|-------------|------------------|--------------|----------------------------|------------------------|--------------|
| 3 | batch | 5 min blanching | water | 100° C. | 1 kg/batch | 17 kW | 26 kg | 2 kg/hr | 26 l |
| 4 | continuous | 3 min blanching | water & steam | 90° C. | 1500 kg/hr | 101 kW | 150 kg/hr | 70 l/hr | 220 l/hr |
| 5 | continuous | 3 min blanching | water & steam | 95° C. | 1500 kg/hr | 105 kW | 160 kg/hr | 60 l/hr | 220 l/hr |
| 6 | continuous | 3 min blanching | water & steam | 99° C. | 1500 kg/hr | 112 kW | 170 kg/hr | 50 l/hr | 220 l/hr |

Texture measurements as described in example 1 were performed on the strings samples produced by the 6 different treatments and data obtained are summarized in table 5B.

TABLE 5B

Texture parameters of Franceline and Leontine strings in a batch and continuous production process after table 5A expressed as average parameter values of n = 6 measurements

| | Franceline | | | | Leontine | | | |
|---|---|---|---|---|---|---|---|---|
| process nr | Fmax (N) | $T_{fp}$ (s) | $T_{Fmax}$ (s) | SA (Ns) | Fmax (N) | $T_{fp}$ (s) | $T_{Fmax}$ (s) | SA (Ns) |
| 1 | 15.3 | 17.1 | 21.4 | 152.4 | 12.5 | 16.0 | 19.5 | 129.7 |
| 2 | 15.2 | 17.4 | 21.6 | 150.9 | 10.5 | 15.5 | 19.6 | 117.8 |
| 3 | 12.1 | 15.9 | 21.3 | 130.0 | 8.5 | 15.2 | 19.4 | 95.8 |
| 4 | 15.6 | 16.9 | 21.4 | 154.7 | 12.7 | 15.9 | 19.7 | 130.1 |
| 5 | 15.3 | 17.2 | 21.5 | 151.9 | 9.9 | 15.6 | 19.3 | 116.8 |
| 6 | 12.2 | 15.8 | 20.9 | 127.8 | 8.3 | 15.3 | 19.4 | 97.4 |
| LSD p = 0.05 | 1.7 | 3.0 | 3.1 | 32.6 | 1.7 | 3.0 | 3.1 | 32.6 |

The texture data from table 5B indicate that the texture parameters Fmax and SA decrease as a function of blanching time in the batch treatments 1-3 and the continuous process treatments 4-6 for both varieties. The decline is more pronounced for the variety Leontine than for Franceline in line with the (lack of) suitability of these varieties for the potato strings product. For Franceline, the processing window from blanching perspective is preferably between 1 and 3 minutes in the batch process, although 5 minutes also results in texture values within the desired range. For the continuous process, the preferred window comprises 90 and 95° C. under the given conditions, whereas at 99° C. the SA value becomes a bit low. This indicates that blanching time and blanching temperature settings can be optimized when preparing the instant potato strings having a refrigerated shelf life intended for tudousi preparation. Over-processing may lead to loss of texture in suitable varieties like Franceline.

Example 6

Preparation of Tudousi and Storage at Different Conditions

The production of instant tudousi can be done by 3 distinct processes that ultimately yield chilled, frozen or freeze dried products. These 3 product forms deliver flexibility with respect to packaging, storage and logistics in the product business chain from producer to end user.
Potatoes from the variety Annabelle were peeled, cut into strings, washed and blanched as described in example 2 for 1 minute. The blanched product was subsequently further treated in the following 3 ways:

1. Blast chilled to 4° C. in a period of 5 minutes using a Hobart Foster BCF21 blast chiller and packed in 1 kg plastic containers with lid and stored in the refrigerator at 4° C.
2. Blast chilled to −20° C. in 8 minutes using a Hobart Foster BCF21 blast chiller and packed in 1 kg plastic containers with lid and stored in the freezer at −20° C.
3. Blast chilled to −20° C. in 8 minutes using a Hobart Foster BCF21 blast chiller, freeze dried with a Labconco freeze dryer equipped with a sample chamber with heated shelves programmed at 35° C. in 24 hours to 99.8% dry matter and subsequently packed in sealed PE bags in portions of 250 g under protective atmosphere and stored at room temperature in darkness.

TABLE 6 preparation and storage conditions of instant tudousi

| description | chilled tudousi | frozen tudousi | freeze dried tudousi |
|---|---|---|---|
| blanching | 1 minute 100° C. | 1 minute 100° C. | 1 minute 100° C. |
| blast chilling | 5 minutes to 4° C. | 8 minutes to −20° C. | 8 minutes to −20° C. |
| freeze drying | not applicable | not applicable | 24 hours to 99.8% dry matter |
| packaging | plastic containers with lid | plastic containers with lid | PE bag under protective atmosphere |
| storage | at 4° C. | at −20° C. | at room temperature (15-20° C.) in darkness |

When frozen tudousi is prepared like chilled tudousi according to the protocol of example 3, will the heating process take about 1 minute longer to prepare a ready to eat product with a comparable visual appearance and serving temperature. Prepared tudousi from a frozen condition has similar texture, structure and flavour profiles like the product from chilled origin.
When freeze dried tudousi is dehydrated in water in a ratio of 1 part tudousi:3 parts water and subsequently prepared like chilled tudousi according to the protocol of example 3, will the heating process take the same time like for the chilled tudousi to prepare a ready to eat product with a comparable visual appearance and serving temperature. Prepared tudousi from a freeze dried origin has similar texture, structure and flavour profiles like the product from chilled or frozen origin.

The invention claimed is:
1. A method for the preparation of pre-packaged instant stir-friable potato strings having a specific gravity of 1.040-1.075 g/ml and a refrigerated shelf life before stir-frying, the method comprising the steps of:
   a. providing potatoes with a specific gravity of 1.040-1.075 g/ml, b. cutting the potatoes of step a) into strings having a cross-sectional area of 20 mm² or less,
c. heating the potato strings of step b) to a temperature of 95-140° C. for 30-360 s,
d. blast chilling the heated potato strings of step c) to 10° C. or less, in 10 minutes or less,
e. packaging the potato strings after step b), c) or d) or during step d),
the method being free of contacting the potato strings with oil, wherein the specific gravity of the potato strings remains within 1.040-1.075 g/ml with no significant change during steps b-d of cutting, heating and blast chilling.

2. The method according to claim 1, further comprising, after step d), a step f) of storing the potato strings at a temperature at or below 10° C.

3. The method according to claim 1, wherein the potato strings in step c) are heated to a temperature between 95° C. and 120° C.

4. The method according to claim 1, wherein in step c) the heating time is 30-180 s.

5. The method according to claim 1, wherein in step d) the heated potato strings are blast chilled to 7° C. or less.

6. The method according to claim 1, wherein in step d) the heated potato strings are blast chilled to a temperature between −10° C. and −25° C.

7. The method according to claim 1, wherein in step e) the potato strings are packaged and sealed in plastic containers.

8. The method according to claim 1, wherein the potatoes of step a) originate from a variety, chosen from the group, consisting of Amandine (EU2504), Annabelle (EU6935), Franceline (EU175), Marilyn (EU17273), and varieties derived therefrom.

9. A method for the preparation of pre-packaged instant stir-friable potato strings, the method comprising the steps of:
   a. providing potatoes with a specific gravity of 1.040-1.075 g/ml,
   b. cutting the potatoes of step a) into strings having a cross-sectional area of 25 mm² or less,
   c. heating the potato strings of step b) to a temperature of 95-140° C. for 30-360 s,
   d. blast chilling the heated potato strings of step c) to below the freezing point of water,
   e. drying the blast chilled potato strings of step d) to a dry matter content of at least 90 w/w %,
   f. packaging the potato strings after step b), c) or d) or during step d) or e),
the method being free of contacting the potato strings with oil, wherein the specific gravity of the potato strings remains within 1.040-1.075 g/ml with no significant change during steps b-d of cutting, heating and blast chilling.

10. The potato strings obtained by the method according to claim 9.

11. A method for the preparation of pre-packaged instant stir-friable potato strings having a dry matter content of 16-19 w/w % and a refrigerated shelf life before stir-frying, the method comprising the steps of:
   a. providing potatoes with a dry matter content of 16-19 w/w %,
   b. cutting the potatoes of step a) into strings having a cross-sectional area of 20 mm² or less,
   c. heating the potato strings of step b) to a temperature of 95-140° C. for 30-360 s,
   d. blast chilling the heated potato strings of step c) to 10° C. or less, in 10 minutes or less,
   e. packaging the potato strings after step b), c) or d) or during step d),
the method being free of contacting the potato strings with oil, wherein the dry matter content of the potato strings remains within 16-19 w/w % with no significant change during steps b-d of cutting, heating and blast chilling.

12. The method according to claim 11, further comprising, after step d), a step f) of storing the potato strings at a temperature at or below 10° C.

13. The method according to claim 11, wherein the potato strings in step c) are heated to a temperature between 95° C. and 120° C.

14. The method according to claim 11, wherein in step c) the heating time is 30-180 s.

15. The method according to claim 11, wherein in step d) the heated potato strings are blast chilled to 7° C. or less.

16. The method according to claim 11, wherein in step d) the heated potato strings are blast chilled to a temperature between −10° C. and −25° C.

17. The method according to claim 11, wherein in step e) the potato strings are packaged and sealed in plastic containers.

18. The method according to claim 11, wherein the potatoes of step a) originate from a variety, chosen from the group, consisting of Amandine (EU2504), Annabelle (EU6935), Franceline (EU175), Marilyn (EU17273), and varieties derived therefrom.

* * * * *